Sept. 11, 1962 G. A. LYON 3,052,965
METHOD OF MAKING WHEELS
Filed Feb. 10, 1958 2 Sheets-Sheet 1

Inventor
GEORGE ALBERT LYON
by Hill, Sherman, Meroni, Gross & Simpson Attys.

Sept. 11, 1962            G. A. LYON            3,052,965
METHOD OF MAKING WHEELS
Filed Feb. 10, 1958            2 Sheets-Sheet 2
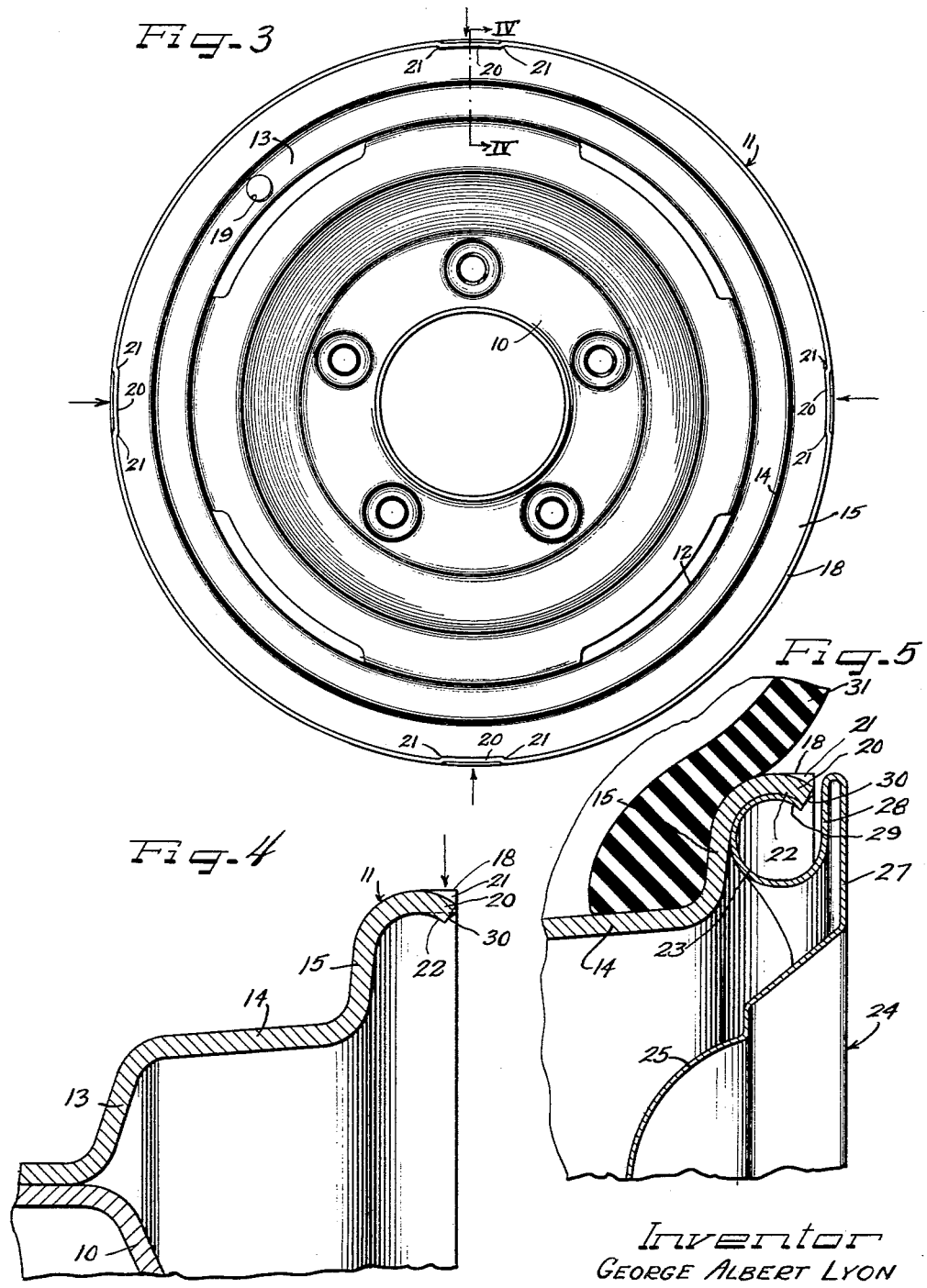
Inventor
GEORGE ALBERT LYON

United States Patent Office 3,052,965
Patented Sept. 11, 1962

3,052,965
METHOD OF MAKING WHEELS
George Albert Lyon, Detroit, Mich., assignor to Lyon Incorporated, Detroit, Mich., a corporation of Delaware
Filed Feb. 10, 1958, Ser. No. 714,137
2 Claims. (Cl. 29—159.1)

The present invention relates to improvements in making wheels and more particularly automobile wheels of the kind having a multi-flange drop center type of rim adapted for use with a tubeless tire.

The provision of means on tire rims for interengagement with retaining means on wheel covers presents a problem where tubeless tires are to be used on the wheel so that the tire rim coacts with the tire to provide an air chamber for inflating the tire. It is highly essential that the tire rim be free from any cracks or grooves or the like through which air may escape.

An important object of the present invention is to provide an improved wheel and more particularly an automobile wheel wherein the tire rim is provided with cover retaining means in a manner to avoid interference with thorough air sealing contact of the bead and adjacent sidewall portion of a tubeless tire with the tire rim.

Another object of the invention is to provide a drop center multi-flange tire rim with integral pressed cover retaining shoulder structure without interference with the use of the tire rim as part of the air chamber of a tubeless tire.

A further object of the invention is to provide shoulder means for cover retention on the terminal flange of a multi-flange drop center tire rim.

Other objects, features and advantages of the present invention will be readily apparent from the following detailed description of a preferred embodiment thereof taken in conjunction with the accompanying drawings, in which:

FIGURE 3 is an outer side elevational view of the wheel showing the same after it has been completed by provision of cover retaining shoulder means on the terminal flange;

FIGURE 4 is a fragmentary sectional elevational enlarged detail view taken substantially on the line IV—IV of FIGURE 3; and FIGURE 5 is a sectional detail view similar to FIGURE 4 but showing a tire and a wheel cover applied to the wheel.

Figure 1:
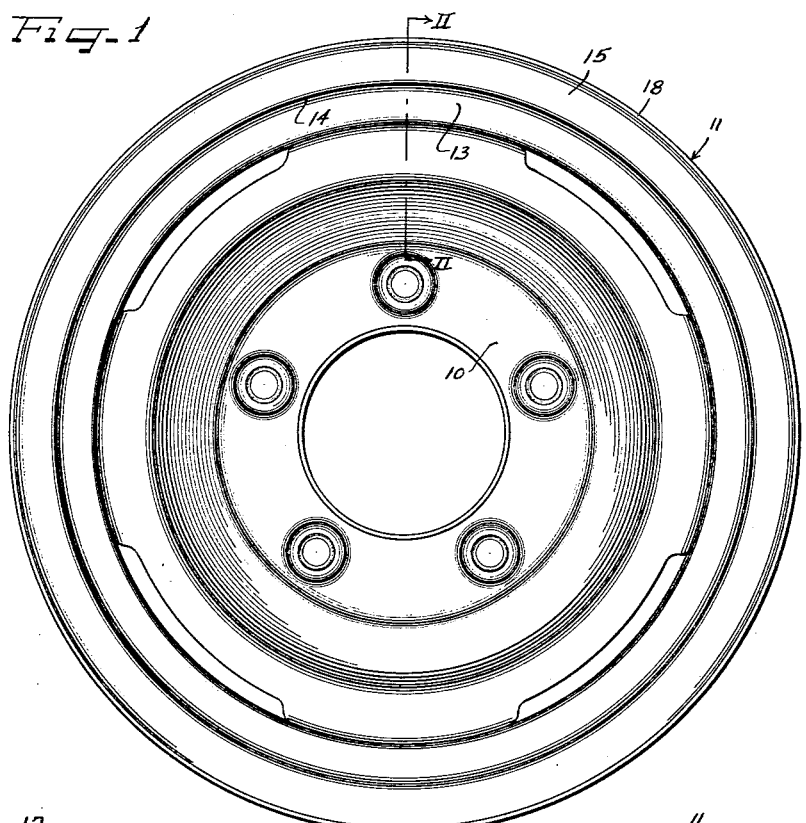
FIGURE 1 is an outer side elevational view of a vehicle wheel that has been partially formed.
Figure 2:
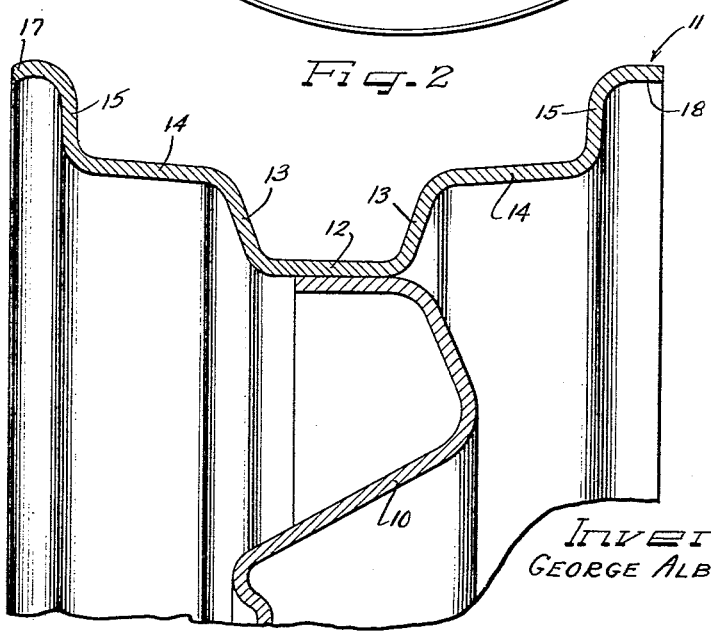
FIGURE 2 is a fragmentary enlarged sectional detail view taken substantially on the line II—II of FIGURE 1.

A vehicle wheel to which the present invention is adapted to be applied is formed by mounting on a disk spider wheel body 10 (FIGS. 1 and 2) a multi-flange drop center tire rim 11. The wheel body is adapted to be made as a stamping from suitable gauge sheet material such as steel plate or sheet. The tire rim 11 is adapted to be made in the usual way by rolling sheet or strip steel stock into the multi-flange channeled drop center form including a base flange 12 attached to the wheel body, inner and outer side flanges 13 from which project in respectively opposite directions intermediate flanges 14 terminating in the usual terminal flanges 15. In this instance, the axially inner terminal flange 15 has a generally curved axially inwardly extending lip portion 17 rolled therein so as to facilitate application and removal of a tire with respect to the tire rim.

At the axially outer side, the terminal flange 15 is rolled with a preferably substantially straight lip 18.

After the tire rim has been assembled with and attached as by means of welding to the wheel body 10, a valve stem aperture 19 is punched in the outer side flange 13 of the tire rim.

At the same time, or before or after punching of the valve stem aperture, the terminal flange lip portion 18 is formed with a circumferentially spaced series of cover retaining shoulder projections 20. Herein, the shoulder projections which are shown as four in number, equidistantly spaced on the terminal flange lip 18, are formed by pressing and bending the material of the shoulder projections generally radially inwardly as indicated by the directional arrows in FIGURES 3 and 4. In effecting this, the material providing the shoulder projections 20 is bent in to the maximum extent at the tip portion of the terminal flange lip 18 to afford a substantially arcuate cross-section for the shoulder projection in each instance in an axial direction and with the axially inner portion of the projection merging into the intermediate portion of the terminal flange lip 18.

In bending the shoulder projections 20 inwardly into the inset relationship shown, the portions thus bendingly inset are cold worked, and side connecting portions 21 are also cold worked to thus afford reinforcements for the terminal flange lip 18. In each instance, the shoulder projection 20 provides a generally axially and radially inwardly facing shoulder 22 generally overlying in undercut relation the juncture between the terminal flange radially extending portion and the lip 18.

An important advantage accruing from pressing the cover retaining projections 20 in the terminal flange lip 18 after formation of the terminal flange lip resides in that the flange lip can thereby be shaped with substantial accuracy not only in the usual forming rolls used in shaping the tire rim section, but also in the usual sizing dies.

Another distinct advantage derived from shaping the retaining shoulder projections 20 after completion of the tire rim 11, and especially after the valve stem aperture 19 has been formed or in the same fixture wherein the valve stem aperture 19 is punched, is that disposition of the shoulder projections 20 can thereby be indexed with respect to the valve stem aperture so that a pair of the shoulder projections equidistantly flanks the valve stem aperture. This is a highly desirable relationship of the retaining shoulder projections 20 relative to the valve stem aperture 19 since thereby registration and retaining engagement alignment of respective cover retaining means such as retaining fingers 23 on a wheel cover 24 (FIG. 5) can readily be effected by alignment of the usual valve stem aperture (not shown) in the wheel cover with a valve stem (not shown) secured in and projecting from the valve stem aperture 19 in the tire rim.

The wheel cover 24 is either a full disk cover that will overlie entirely the outer side of the wheel, or a ring member, but in either event is made from sheet metal and includes a circular body 25 having a radially outer margin 27 for overlying the tire rim terminal flange 15 inclusive of the lip 18. An underturned flange 28 carried by the marginal portion 27 is provided with the retaining fingers 23 which are of generally loop form and having resilient generally expansible retaining terminal portions 29 that are engageable in shouldering relation with the undercut shoulder 22 of the respective shoulder projection 20 with which associated.

It will be observed that since the retaining shoulder projections 20 are formed from the axially outer extremity of the terminal flange lip 18, the end extremity of each of the projections comprises a generally radially and axially inwardly tilted cam surface 30 resulting from the radially inward tilting of the material of the rim flange lip 18 incident to bending in of the respective shoulder projection 20. The cam edge 30 facilitates pressing in of the retaining fingers 23 into retained snapin engagement with the respective associated retaining shoulder projection 20 in each instance.

In the internested, retained interengagement of the retaining fingers 23 with the shoulder projections 20, means on or associated with one or more of the retaining fingers 23 and more especially the terminal portions 29 thereof are engageable with the insetting bend shoulders 21 of at least one of the retaining shoulder projections 20 for holding the cover against turning on the wheel.

An advantage accruing from provisions of the cover retaining structure projections 20 in the axially outermost marginal portion of the terminal flange lip 18 and merging into an intermediate portion of such rim flange lip is that the sealing engagement of the surfaces of a tubeless tire 31 mounted in the rim can make full contact with the opposing surfaces of the rim flanges. Thus, leakage of air from chambers within the tire rim and tire is avoided.

It will be understood that modifications and variations may be effected without departing from the scope of the novel concepts of the present invention.

I claim as my invention:

1. In a method of making vehicle wheels, rolling a tire rim from metal stock and in such rolling shaping a terminal flange at the outer side of the tire rim with a substantially straight lip having a generally axially outwardly facing terminal edge, and at circumferentially spaced intervals pressing in the terminal marginal portion of said lip including said edge into generally radially inwardly extending cover retaining projections affording undercut-like shoulders and tilting the tips thereof generally radially and axially inwardly to provide lead-in cam surfaces.

2. In a method of making vehicle wheels, rolling a tire rim from metal stock and in such rolling shaping a terminal flange at the outer side of the tire rim with a substantially straight lip having a generally axially outwardly facing terminal edge, and pressing a limited marginal portion of the terminal flange lip inclusive of the involved terminal edge portion of the lip generally radially inwardly to a predetermined limited extent and starting from an intermediate point in the width of the lip to project said limited marginal portion radially inwardly to a progressively greater amount along a line extending from said intermediate point to said terminal edge portion and at the same time forming insetting bend shoulders at each side of said limited marginal portion and tilting said involved terminal edge portion generally radially and axially inwardly to provide a lead-in cam surface, whereby to afford a generally radially and axially inwardly and also circumferentially facing cover retaining shoulder formation.

References Cited in the file of this patent

UNITED STATES PATENTS

| | | |
|---|---|---|
| Re. 24,229 | Lyon | Oct. 23, 1956 |
| 2,126,223 | Schwinn | Aug. 9, 1938 |
| 2,200,205 | Lyon | May 7, 1940 |
| 2,200,569 | Whitten | May 14, 1940 |
| 2,271,107 | Swangren | Jan. 27, 1942 |
| 2,394,958 | Wood | Feb. 12, 1946 |
| 2,607,633 | Lyon | Aug. 16, 1952 |
| 2,625,439 | Horn | Jan. 13, 1953 |
| 2,654,637 | Lyon | Oct. 6, 1953 |
| 2,860,922 | Lyon | Nov. 18, 1958 |

FOREIGN PATENTS

| | | |
|---|---|---|
| 452,111 | Canada | Oct. 26, 1948 |